**

US008044542B2

(12) United States Patent
Masuda et al.

(10) Patent No.: US 8,044,542 B2
(45) Date of Patent: Oct. 25, 2011

(54) MOTOR ROTOR AND COMPRESSOR EQUIPPED WITH THE MOTOR ROTOR

(75) Inventors: Masanori Masuda, Sakai (JP); Kazuhiro Furusho, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 246 days.

(21) Appl. No.: 12/525,868

(22) PCT Filed: Feb. 14, 2008

(86) PCT No.: PCT/JP2008/052414
§ 371 (c)(1),
(2), (4) Date: Aug. 5, 2009

(87) PCT Pub. No.: WO2008/099871
PCT Pub. Date: Aug. 21, 2008

(65) Prior Publication Data
US 2010/0314955 A1    Dec. 16, 2010

(30) Foreign Application Priority Data

Feb. 15, 2007  (JP) .................................. 2007-034635

(51) Int. Cl.
*H02K 9/26*  (2006.01)
(52) U.S. Cl. ..................... 310/56; 310/216.001; 417/321
(58) Field of Classification Search .................... 310/56, 310/216.001; 417/321
See application file for complete search history.

(56) References Cited

U.S. PATENT DOCUMENTS

| | | | | |
|---|---|---|---|---|
| 2,013,777 A | * | 9/1935 | Dennedy | 418/93 |
| 3,514,225 A | * | 5/1970 | Monden et al. | 3/367 |
| 4,333,748 A | * | 6/1982 | Erickson | 96/188 |
| 4,358,696 A | * | 11/1982 | Liu et al. | 310/156.56 |
| 4,496,862 A | * | 1/1985 | Weber | 310/56 |
| 4,592,703 A | * | 6/1986 | Inaba et al. | 417/366 |
| 4,762,471 A | * | 8/1988 | Asanuma et al. | 417/372 |
| 4,922,152 A | * | 5/1990 | Gleghorn et al. | 310/156.84 |
| 5,859,483 A | * | 1/1999 | Kliman et al. | 310/58 |
| 5,893,205 A | * | 4/1999 | McClelland | 29/598 |
| 5,954,482 A | * | 9/1999 | Ijiri et al. | 417/310 |
| 6,147,428 A | * | 11/2000 | Takezawa et al. | 310/156.57 |
| 6,675,460 B2 | * | 1/2004 | Reiter et al. | 29/596 |
| 6,902,380 B2 | * | 6/2005 | Ojima et al. | 417/410.4 |
| 7,102,259 B2 | * | 9/2006 | Kawaguchi et al. | 310/61 |
| 2003/0030333 A1 | * | 2/2003 | Johnsen | 310/54 |

(Continued)

FOREIGN PATENT DOCUMENTS

JP         61-125693 U    8/1986

(Continued)

*Primary Examiner* — Quyen Leung
*Assistant Examiner* — Alex W Mok
(74) *Attorney, Agent, or Firm* — Global IP Counselors

(57) ABSTRACT

A motor rotor for a compressor includes a rotor core, at least one gas passage and an oil passage. The rotor core is configured to rotate about a rotation axis and has a plurality of stacked steel plates. The gas passage penetrates the rotor core in its axial direction and allows a gas fluid to flow therethrough from a first axial direction end portion of the rotor core to a second axial direction end portion on the opposite axial side. The oil passage is positioned radially outwardly of the gas passage inside the rotor core relative to the rotation axis. The oil passage allows oil to flow from the second axial direction end portion to the first axial direction end portion, which is opposite to the gas flow direction through the gas passage.

20 Claims, 5 Drawing Sheets

U.S. PATENT DOCUMENTS

| | | |
|---|---|---|
| 2003/0075996 A1* | 4/2003 | Yoshida et al. ............... 310/58 |
| 2003/0173861 A1* | 9/2003 | Kawaguchi et al. .......... 310/261 |
| 2004/0005234 A1* | 1/2004 | Dreiman et al. .............. 417/559 |
| 2005/0067915 A1 | 3/2005 | Ida et al. |
| 2006/0120889 A1* | 6/2006 | Dreiman et al. .............. 417/321 |

FOREIGN PATENT DOCUMENTS

| | | |
|---|---|---|
| JP | 64-047991 U | 3/1989 |
| JP | 01-198253 A | 8/1989 |
| JP | 04-112652 A | 4/1992 |
| JP | 05-260699 A | 10/1993 |
| JP | 11-027883 A | 1/1999 |
| JP | 2003-324869 A | 11/2003 |
| JP | 2004-332628 A | 11/2004 |
| JP | 2005-124281 A | 5/2005 |
| JP | 2006-105123 A | 4/2006 |
| JP | 2006-230054 A | 8/2006 |
| JP | 2007032429 A * | 2/2007 |

* cited by examiner

MOTOR ROTOR AND COMPRESSOR EQUIPPED WITH THE MOTOR ROTOR

CROSS-REFERENCE TO RELATED APPLICATIONS

This U.S. National stage application claims priority under 35 U.S.C. §119(a) to Japanese Patent Application No. 2007-034635, filed in Japan on Feb. 15, 2007, the entire contents of which are hereby incorporated herein by reference.

TECHNICAL FIELD

The present invention relates to a motor rotor that is used in an environment where a gas fluid and oil circulate and to a compressor equipped with the motor rotor.

BACKGROUND ART

Conventionally, among compressors and the like for compressing a refrigerant of a refrigerant circuit, there has been the compressor of Japanese Patent Publication No. H05-260699, which has a structure where the inside of a casing of the compressor is filled with oil in order to lubricate mechanical parts of the compressor and where a gas rises through a gas passage of a motor rotor and drops oil from a core cut of an outer periphery of a motor stator.

SUMMARY OF THE INVENTION

<Technical Problem>

However, in the compressor described in patent document 1, the gas and the oil that flow through the inside of the motor rotor rise without being sufficiently separated, so there is the fear that the oil will be pushed by the flow of the gas and then released into the refrigerant circuit outside the compressor such that the oil no longer returns to an oil pool in the lower portion of the casing (such that the phenomenon of so-called oil shortage occurs). Thus, the fear for the oil inside the casing to become insufficient (that is, oil exhaustion) such that wear and seizure occur in a compression mechanism part that is a mechanical part of the compressor, bearing portions for a shaft and the like becomes higher.

It is a problem of the present invention to provide a motor rotor that can effectively separate gas and oil and can prevent oil shortage and oil exhaustion and a compressor equipped with the motor rotor.

<Solution to the Problem>

A motor rotor according to a first aspect of the invention comprises a rotor core, at least one gas passage and an oil passage. The rotor core is configured to stack plural stacked steel plates. The gas passage penetrates the rotor core in its axial direction and allows a gas fluid to flow therethrough from a first axial direction end portion that is one axial direction end portion of the rotor core to a second axial direction end portion on the opposite side. The oil passage is positioned further outside in the radial direction of the rotor core than the gas passage inside the rotor core. The oil passage allows oil to flow from the second axial direction end portion to the first axial direction end portion, which is the opposite direction of the direction in which the gas fluid flows through the gas passage.

Here, the motor rotor is equipped with the oil passage that is positioned further outside in the radial direction of the rotor core than the gas passage inside the rotor core and allows the oil to flow from the second axial direction end portion to the first axial direction end portion, which is the opposite direction of the direction in which the gas fluid flows through the gas passage, so the oil running from the gas passage into clearances between the stacked steel plates can be allowed to flow through the oil passage to a predetermined oil pool. As a result, the oil separation effect improves, and it becomes possible to prevent oil shortage and oil exhaustion.

A motor rotor according to a second aspect of the invention is the motor rotor according to the first aspect of the invention and further comprises closing means (member) that closes an opening on the second axial direction end portion side of the oil passage.

Here, the motor rotor is equipped with the closing means that closes an opening on the second axial direction end portion side of the oil passage, so the gas and the oil can be prevented from flowing through the oil passage from the first axial direction end portion to the second axial direction end portion, and it becomes possible to effectively prevent oil shortage.

A motor rotor according to a third aspect of the invention is the motor rotor according to the first aspect or the second aspect of the invention and further comprises an oil barrier. The oil barrier is disposed further outward in the radial direction of the rotor core than the gas passage inside the rotor core. The oil barrier stops a flow of the oil running outward in the radial direction of the gas passage through a space between two of the stacked steel plates that are adjacent from the gas passage.

Here, the oil barrier is disposed further outward in the radial direction of the rotor core than the gas passage inside the rotor core and stops a flow of the oil running outward in the radial direction of the gas passage through a space between two of the stacked steel plates that are adjacent from the gas passage, so the oil running from the gas passage to the stacked steel plates collects at the oil barrier, and the oil droplets become larger, so it is possible to further improve the oil separation efficiency.

A motor rotor according to a fourth aspect of the invention is the motor rotor according to the third aspect of the invention, wherein the oil barrier and the oil passage are directly communicated with each other.

Here, the oil barrier and the oil passage are directly communicated with each other, so the oil droplets that have become larger at the place of the oil barrier directly enter the oil passage, so decreases in the diameter and size of the oil droplets resulting from re-dispersion of the oil droplets can be prevented, and it is possible to further improve the oil separation efficiency.

A motor rotor according to a fifth aspect of the invention is the motor rotor according to the third aspect or the fourth aspect of the invention and further comprises oil running control means (device). The oil running control means controls running of the oil outward in the radial direction of the gas passage by applying compressive force from both axial direction ends of the rotor core to a portion of the stacked steel plates that is further outside in the radial direction than the oil barrier.

Here, the oil running control means partially compresses a portion of the stacked steel plates that is further outside in the radial direction than the oil barrier, so it becomes possible to reduce the clearances between the stacked steel plates on the outer side of the oil barrier, enlarge the clearances between the stacked steel plates on the inner side of the oil barrier, and control running of the oil. Thus, the amount of oil running from the gas passage to the oil barrier increases, but running of the oil further outside in the radial direction than the oil barrier can be suppressed.

A motor rotor according to a sixth aspect of the invention is the motor rotor according to any of the first aspect to the fifth aspect of the invention and further comprises suppressing means (portion). The suppressing means suppresses running of the oil and is disposed on a passage inner wall of the oil passage or a side peripheral wall of the rotor core.

Here, the motor rotor is further equipped with the suppressing means that suppresses running of the oil and the suppressing means disposed on a passage inner wall of the oil passage or a side peripheral wall of the rotor core, so running of the oil outward in the radial direction of the rotor core from the oil passage can be prevented, and it is possible to return the oil through the oil passage to a predetermined oil pool.

A motor rotor according to a seventh aspect of the invention is the motor rotor according to the first aspect of the invention and further comprises a guide member. The guide member includes a communication space and a gas fluid outlet. The communication space allows an opening on the second axial direction end portion side of the gas passage and an opening on the second axial direction end portion side of the oil passage to be communicated with each other. The gas fluid outlet opens further inside in the radial direction of the rotor core than the opening on the second axial direction end portion side of the gas passage.

Here, the motor rotor is equipped with the guide member that includes the communication space that allows an opening on the second axial direction end portion side of the gas passage and an opening on the second axial direction end portion side of the oil passage to be communicated with each other and the gas fluid outlet that opens further inside in the radial direction of the rotor core than the opening on the second axial direction end portion side of the gas passage, so the gas and the oil can be separated inside the communication space by centrifugal force during operation of the motor rotor. Thus, the oil can be reliably returned to a predetermined oil pool in the compressor; as a result, the oil separation effect improves, and oil shortage can be prevented.

A motor rotor according to an eighth aspect of the invention is the motor rotor according to the seventh aspect of the invention, wherein the flow resistance of the gas fluid is larger in the oil passage than in the gas passage.

Here, the flow resistance of the gas fluid is larger in the oil passage than in the gas passage, so a flow of the gas through the oil passage from the first axial direction end portion to the second axial direction end portion can be suppressed, the oil is no longer pushed and returned by the gas in the oil passage to the second axial direction end portion, and the oil separation efficiency improves.

A motor rotor according to a ninth aspect of the invention is the motor rotor according to the eighth aspect of the invention, wherein the total area of the cross-sectional area of the gas passage is larger than the total area of the cross-sectional area of the oil passage.

Here, the total area of the cross-sectional area of the gas passage is larger than the total area of the cross-sectional area of the oil passage, so the flow resistance of the gas fluid can be made larger in the oil passage than in the gas passage by setting and changing the difference in the flow path resistance of the gas fluid by the flow path cross-sectional areas, a flow of the gas through the oil passage from the first axial direction end portion to the second axial direction end portion can be easily and inexpensively suppressed, and it becomes possible for the oil separation efficiency to improve.

A compressor according to a tenth aspect of the invention comprises the motor rotor according to any of the first aspect to the ninth aspect of the invention.

Here, the compressor is equipped with the motor rotor that is equipped with the oil passage that is positioned further outside in the radial direction of the rotor core than the gas passage and allows the oil to flow from the second axial direction end portion to the first axial direction end portion, which is the opposite direction of the direction in which the gas fluid flows through the gas passage, so the oil separation effect improves, and it becomes possible to prevent oil shortage and oil exhaustion. For that reason, it also becomes possible to significantly extend the lifespan of the compressor, and product reliability also becomes higher.

A compressor according to an eleventh aspect of the invention comprises the motor rotor according to any of the seventh aspect to the ninth aspect of the invention. Further, the compressor uses a refrigerant comprising carbon dioxide as the gas fluid and uses refrigerating machine oil whose 100-degree viscosity is equal to or higher than 10 cSt as the oil.

Here, the compressor uses a high-pressure gas refrigerant comprising carbon dioxide and uses high-viscosity oil whose 100-degree viscosity is equal to or higher than 10 cSt even though the gas density is high, so running of the oil from the oil passage to the stacked steel plates can be suppressed, and the gas and the oil can be effectively separated in the communication space inside the guide member by centrifugal force during operation of the motor rotor, so the oil separation efficiency improves.

ADVANTAGEOUS EFFECTS OF THE INVENTION

According to the first aspect of the invention, the oil running from the gas passage into clearances between the stacked steel plates can be allowed to flow through the oil passage to a predetermined oil pool; thus, the oil separation effect improves, and it becomes possible to prevent oil shortage and oil exhaustion.

According to the second aspect of the invention, the gas and the oil can be prevented from flowing through the oil passage from the first axial direction end portion to the second axial direction end portion, and it becomes possible to effectively prevent oil shortage.

According to the third aspect of the invention, the oil running from the gas passage to the stacked steel plates collects at the oil barrier, and the oil droplets become larger, so it is possible to further improve the oil separation efficiency.

According to the fourth aspect of the invention, decreases in the diameter and size of the oil droplets resulting from re-dispersion of the oil droplets can be prevented, and it is possible to further improve the oil separation efficiency.

According to the fifth aspect of the invention, the amount of oil running from the gas passage to the oil barrier can be increased, and running of the oil further outside in the radial direction than the oil barrier can be suppressed.

According to the sixth aspect of the invention, running of the oil outward in the radial direction of the rotor core from the oil passage can be prevented, and it is possible to return the oil through the oil passage to a predetermined oil pool.

According to the seventh aspect of the invention, the oil can be reliably returned to a predetermined oil pool in the compressor; as a result, the oil separation effect improves, and oil shortage can be prevented.

According to the eighth aspect of the invention, the oil is no longer pushed and returned by the gas in the oil passage to the second axial direction end portion, and the oil separation efficiency improves.

According to the ninth aspect of the invention, a flow of the gas through the oil passage from the first axial direction end portion to the second axial direction end portion can be easily and inexpensively suppressed, and it becomes possible for the oil separation efficiency to improve.

According to the tenth aspect of the invention, the oil separation effect improves, and it becomes possible to prevent oil shortage and oil exhaustion, so the lifespan of the compressor can also be significantly extended, and product reliability also becomes higher.

According to the eleventh aspect of the invention, running of the oil from the oil passage to the stacked steel plates can be suppressed, and the oil separation efficiency improves.

DETAILED DESCRIPTION OF THE INVENTION

Next, embodiments of a motor rotor of the present invention and a compressor equipped with the motor rotor will be described with reference to the drawings.

First Embodiment

<Configuration of Compressor>
Below, the configuration of a compressor equipped with a motor rotor 1 of a first embodiment will be described.

Figure 1:
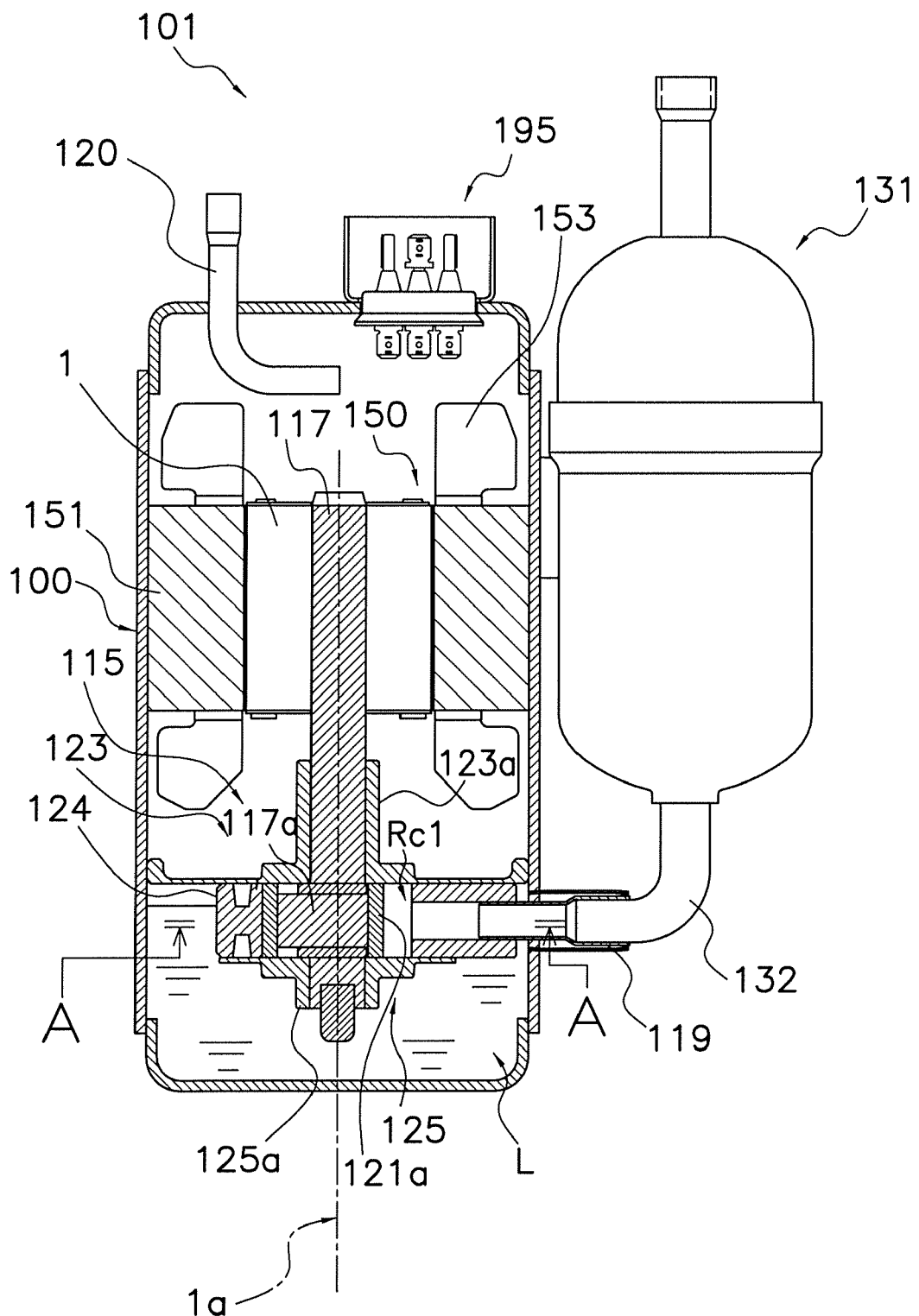
FIG. 1 is a configural diagram of a motor rotor pertaining to a first embodiment of the present invention and a compressor equipped with the motor rotor.

A rotary compressor 101 pertaining to the first embodiment is, as shown in FIG. 1, mainly configured by a vertically long circular cylinder-shaped hermetically sealed dome casing 100, a rotary compression mechanism part 115, a drive motor 150, a suction pipe 119, a discharge pipe 120 and a terminal 195. It will be noted that the motor rotor 1 of the first embodiment is built into the inside of the casing 100 of the rotary compressor 101.

Below, the components of the rotary compressor 101 will be described in detail.
{Details of Components of Rotary Compressor}
(1) Casing In the casing 100 of the rotary compressor 101, there are mainly housed the rotary compression mechanism part 115, which compresses a gas refrigerant comprising carbon dioxide, and the drive motor 150, which is disposed above the rotary compression mechanism part 115. The rotary compression mechanism part 115 and the drive motor 150 are coupled together by a crankshaft 117 that is disposed so as to extend in the up-and-down direction inside the casing 100.

(2) Drive Motor

The drive motor 150 is a DC motor in the present embodiment and is mainly configured by an annular motor stator 151, which is fixed to an inner wall surface of the casing 100, and the motor rotor 1, which is housed such that it may freely rotate on the inner side of the motor stator 151 with a slight gap (air gap passage) therebetween.

A copper wire is coiled around teeth portions (not shown) of the motor stator 151, and coil ends 153 are formed on the top and bottom of the motor stator 151. Further, core cut portions (not shown) that are cuttingly formed in plural places at predetermined intervals in the circumferential direction and lead from the upper end surface of the motor stator 151 to the lower end surface of the motor stator 151 are disposed in the outer peripheral surface of the motor stator 151.

The crankshaft 117 is fixed to the motor rotor 1 so as to follow its axis of rotation 1a.

Figure 3:
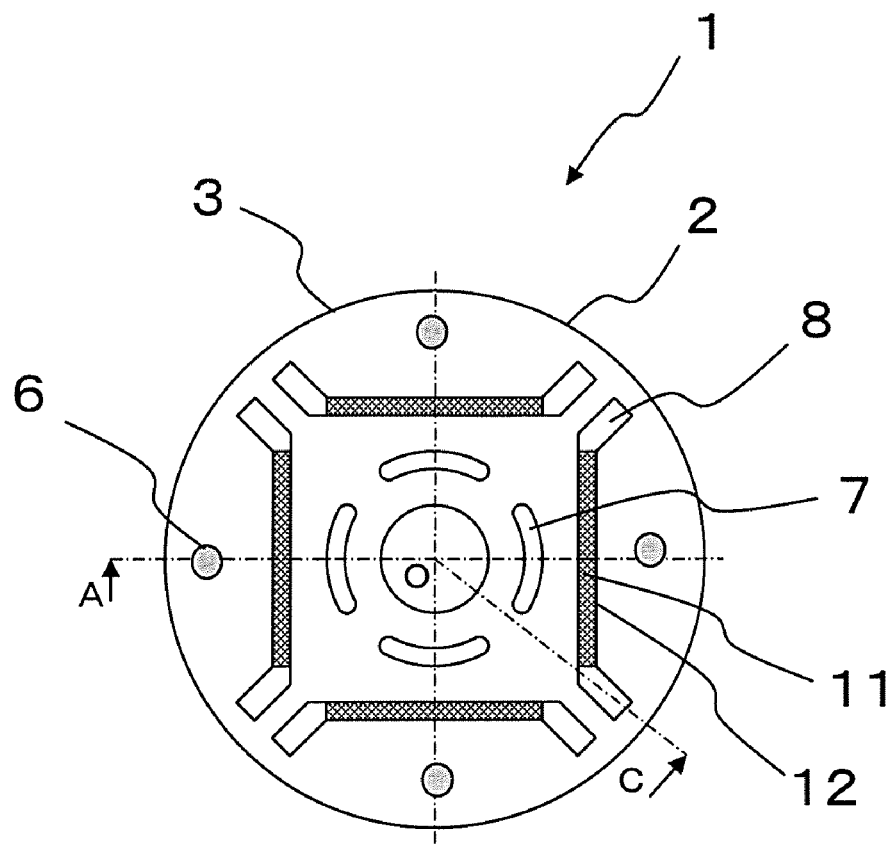
FIG. 3 is a diagram showing, as seen from above, a state where an upper end plate of the motor rotor of FIG. 1 has been removed.
Figure 4:
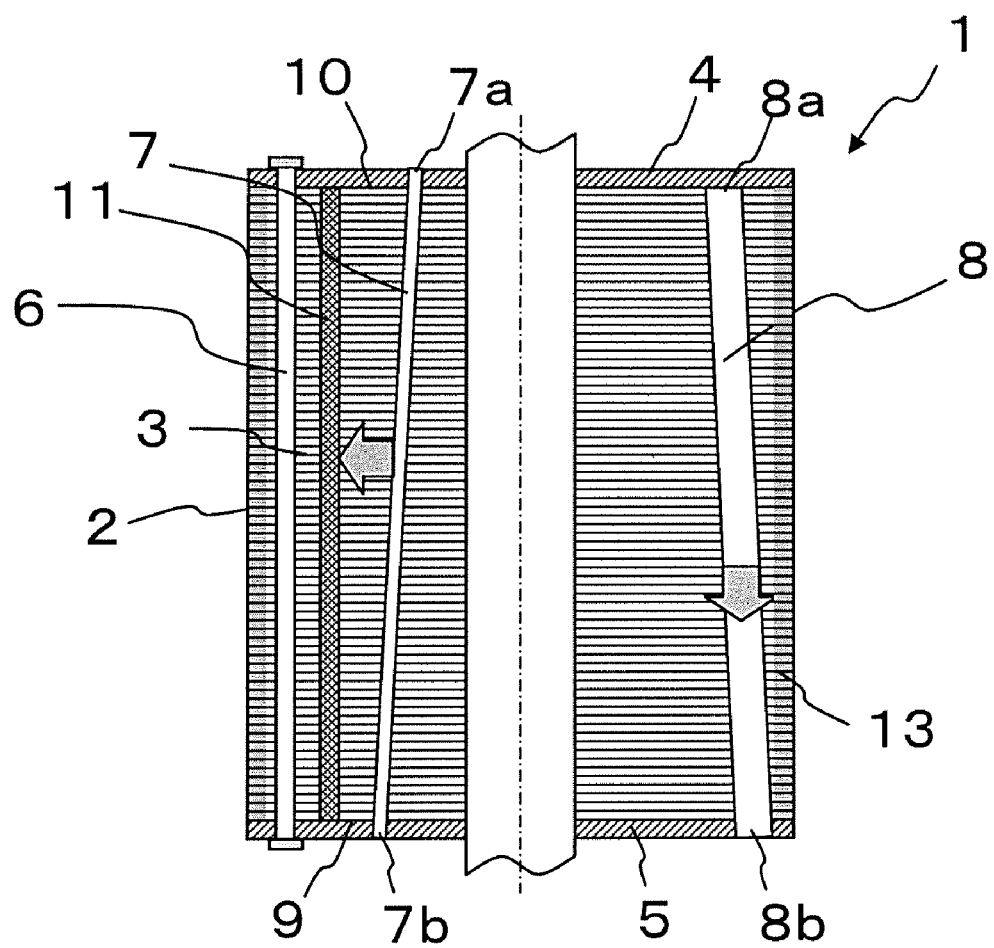
FIG. 4 is a diagram showing the motor rotor of FIG. 1 as seen from an A-O-C cross section of FIG. 3.

The configuration of the motor rotor 1 will be described in detail in the following entry.
<Configuration of Motor Rotor 1>
The motor rotor 1 is, as shown in FIG. 3 and FIG. 4, equipped with a rotor core 2, an upper end plate 4, a lower end plate 5, rivets 6, plural gas passages 7, oil passages 8 and magnet plates 11.

The rotor core 2 is a main portion of the motor rotor 1 that is configured to stack plural stacked steel plates 3.

The plural gas passages 7 are passages that penetrate the rotor core 2 in its axial direction and allow a gas fluid to flow therethrough from a lower end portion 9 (what is called a first axial direction end portion in the present invention) that is one axial direction end portion of the rotor core 2 to an upper end portion 10 (what is called a second axial direction end portion in the present invention) on the opposite side. It will be noted that it suffices as long as there is at least one of the gas passages 7 and, although the number of the gas passages 7 is not particularly limited in the present invention, four of the gas passages 7 are formed around the center of the rotor core 2 in FIG. 4.

The oil passages 8 are passages that are positioned further outside in the radial direction of the rotor core 2 than the gas passages 7 inside the rotor core 2 and allow oil to flow from the upper end portion 10 to the lower end portion 9, which is the opposite direction of the direction in which the gas fluid flows through the gas passages 7. The oil passages 8 can allow the oil running from the gas passages 7 into clearances between the stacked steel plates 3 to flow to an oil pool of oil L in the bottom portion of the casing 100, so the oil separation effect improves, and it is possible to prevent oil shortage.

It will be noted that, in the motor rotor 1 shown in FIG. 3 and FIG. 4, the oil passages 8 include the function of magnetic barriers that prevent the diffusion of magnetism generated from the magnet plates 11.

The upper end plate 4 and the lower end plate 5 sandwich the plural stacked steel plates 3 from both ends of the rotor core 2 and are fastened by the rivets 6 together with the plural stacked steel plates 3. The upper end plate 4 includes openings 7a that are communicated with the gas passages 7, but the upper end plate 4 closes openings 8a on the upper end portion 10 side of the oil passages 8. The upper end plate 4 corresponds to what is called closing means or closing member in the present invention. Thus, the openings 8a on the upper end portion 10 side of the oil passages 8 are closed by the upper end plate 4, so the gas and the oil can be prevented from flowing through the oil passages 8 from the lower end portion 9 to the upper end portion 10, and it becomes possible to effectively prevent oil shortage. The lower end plate 5 includes openings 7b that are communicated with the gas passages 7 and openings 8b that are communicated with the oil passages 8.

Further, the upper end plate 4 also closes openings in upper ends of slits 12 into which the later-described magnet plates 11 of the rotor core 2 are inserted, so oil droplets collecting on the magnet plates 11 do not leak to the outside from the upper end portion 10 of the rotor core 2.

The magnet plates 11 comprise plate-shaped permanent magnets and are inserted into the four slits 12 that are formed in the rotor core 2 and extend in the axial direction of the rotor core 2. The magnet plates 11 are disposed in four places further outward in the radial direction of the rotor core 2 than the gas passages 7 inside the rotor core 2. The magnet plates 11 are capable of stopping a flow of the oil running outward in the radial direction of the gas passages 7 through a space between two of the stacked steel plates 3 that are adjacent from the gas passages 7. The magnet plates 11 correspond to what are called oil barriers in the present invention. Thus, the oil running from the gas passages 7 to the stacked steel plates 3 collects at the magnet plates 11 that function as oil barriers, and the oil droplets become larger, so it is possible to further improve the oil separation efficiency. It will be noted that dedicated oil barriers that block the oil that runs may also be disposed separately from the magnet plates 11.

The magnet plates 11 that function as oil barriers (and the slits 12 into which the magnet plates 11 are inserted) and the oil passages 8 are directly communicated with each other. In FIG. 4, the oil passage 8 is formed on both sides of one magnet plate 11. Thus, the oil droplets that have become larger at the places of the magnet plates 11 directly enter the oil passages 8, so reductions in the diameters and sizes of the oil droplets resulting from re-dispersion of the oil droplets can be avoided, and it is possible to further improve the oil separation efficiency.

Further, a resin whose oil resistance is high, such as a varnish, is applied to the rotor core 2 and is fired and hardened in order to suppress running of the oil and the resin is disposed on passage inner walls of the oil passages 8 or a side peripheral surface of the rotor core 2. In FIG. 4, the numeral 13 indicates a coating portion that covers the entire side peripheral surface of the rotor core 2 to form a suppressing portion or means. Here, the resin whose oil resistance is high, such as a varnish, corresponds to what is called suppressing means (a suppressing portion) in the present invention.

Moreover, the gas passages 7 that penetrate the motor rotor 1 in its axial direction slant slightly inside in the radial direction of the motor rotor 1 with respect to the direction in which the gas flows (upward in FIG. 4), so the oil rises counter to centrifugal force (i.e., of the inner walls of the gas passages 7, the force that pushes the oil outside in the radial direction of the motor rotor 1 becomes stronger). Consequently, it becomes easier for the oil to seep through to the stacked steel plates 3, and the oil separation efficiency further improves.

Moreover, the oil passages 8 slant slightly outward in the radial direction of the motor rotor 1 in the direction of the oil pool of the oil L in the bottom portion of the casing 100 (downward in FIG. 4), so the oil that has been collected in the oil passages 8 is more smoothly returned by centrifugal force to the oil pool of the oil L in the bottom portion of the casing 100, so the oil returning characteristic improves.

(3) Rotary Compression Mechanism Part

Figure 2:
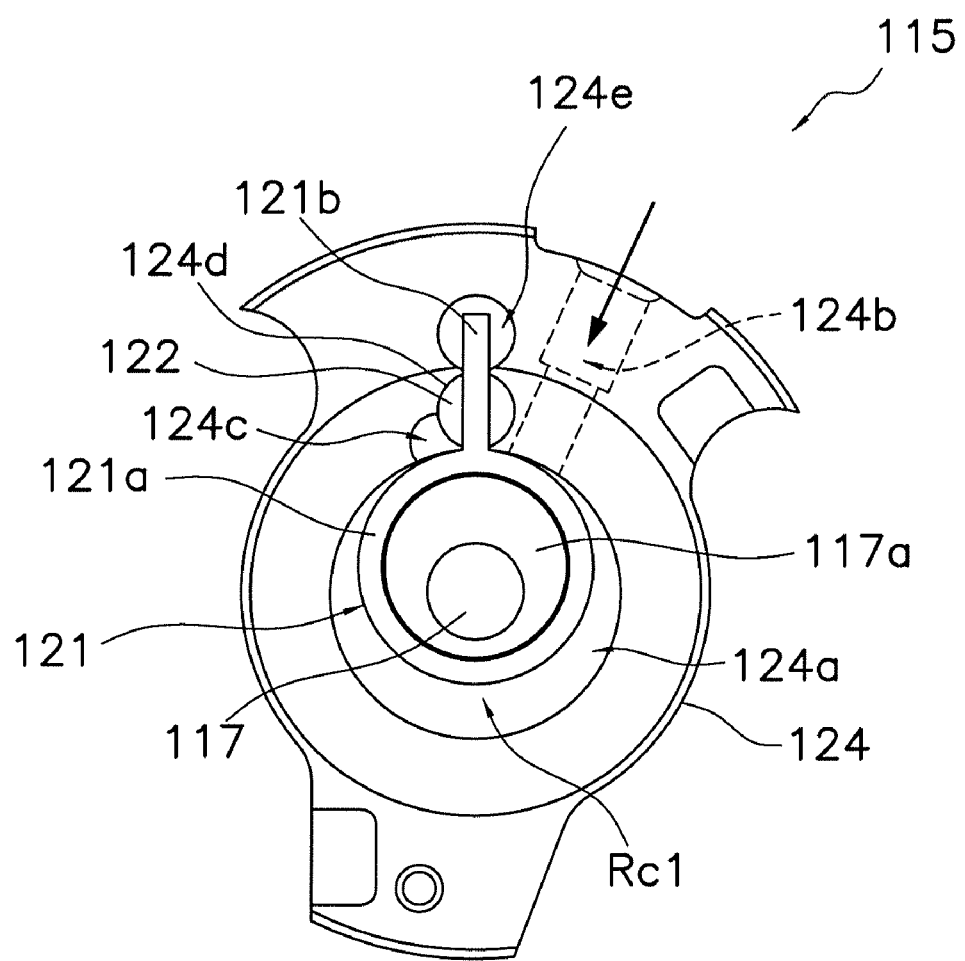
FIG. 2 is a cross-sectional diagram, along line A-A, of the compressor of FIG. 1.

The rotary compression mechanism part 115 is, as shown in FIG. 1 and FIG. 2, mainly configured by the crankshaft 117, a piston 121, a bush 122, a front head 123, a cylinder block 124 and a rear head 125. Further, the rotary compression mechanism part 115 is immersed in the oil L stored in the bottom portion of the casing 100, and the oil L is supplied by differential pressure to the rotary compression mechanism part 115. Below, the components of the rotary compression mechanism part 115 will be described in detail.

a) Cylinder Block

In the cylinder block 124, as shown in FIG. 1 and FIG. 2, there are formed a cylinder hole 124a, a suction hole 124b, a discharge path 124c, a bush housing hole 124d and a blade housing hole 124e. The cylinder hole 124a is, as shown in FIG. 1 and FIG. 2, a circular column-shaped hole that penetrates the cylinder block 124 along its plate thickness direction. The suction hole 124b penetrates the cylinder block 124 and extends from the outer peripheral wall surface of the cylinder block 124 to the cylinder hole 124a. The discharge path 124c is formed by cutting away a part of the inner peripheral side of a circular cylinder portion that shapes the cylinder hole 124a. The bush housing hole 124d is a hole that penetrates the cylinder block 124 along its plate thickness direction and, when seen along the plate thickness direction, is positioned between the suction hole 124b and the discharge path 124c. The blade housing hole 124e is a hole that penetrates the cylinder block 124 along its plate thickness direction and is communicated with the bush housing hole 124d.

Additionally, the cylinder block 124 is fitted together with the front head 123 and the rear head 125 such that the discharge path 124c faces the front head 123 side in a state where an eccentric shaft portion 117a of the crankshaft 117 and a rotor portion 121a of the piston 121 are housed in the cylinder hole 124a, a blade portion 121b of the piston 121 and the bush 122 are housed in the bush housing hole 124d, and the blade portion 121b of the piston 121 is housed in the blade housing hole 124e. As a result, a cylinder chamber Rc1 is formed in the rotary compression mechanism part 115, and the cylinder chamber Rc1 is sectioned by the piston 121 into a suction chamber that is communicated with the suction hole 124b and a discharge chamber that is communicated with the discharge path 124c. It will be noted that, in this state, the rotor portion 121a is fitted into in the eccentric shaft portion 117a.

b) Crankshaft

The eccentric shaft portion 117a is disposed on one end portion of the crankshaft 117. Additionally, the side of the crankshaft 117 where the eccentric shaft portion 117a is not disposed is fixed to the motor rotor 1 of the drive motor 150.

c) Piston

The piston 121 includes the substantially circular cylinder-shaped rotor portion 121a and the blade portion 121b that projects outside in the radial direction of the rotor portion 121a. It will be noted that the rotor portion 121a is inserted into the cylinder hole 124a in the cylinder block 124 in a state where the rotor portion 121a is fitted together with the eccentric shaft portion 117a of the crankshaft 117. Thus, the rotor portion 121a revolves about the axis of rotation of the crankshaft 117 when the crankshaft 117 rotates. Further, the blade portion 121b is housed in the bush housing hole 124d and the blade housing hole 124e. Thus, the blade portion 121b swings and, at the same time, moves back and forth along its longitudinal direction.

d) Bush

The bush 122 is a substantially semicircular column-shaped member and is housed in the bush housing hole 124d so as to sandwich the blade portion 121b of the piston 121.

e) Front Head

The front head 123 is a member that covers the discharge path 124c side of the cylinder block 124 and is fitted together with the casing 100. A bearing portion 123a is formed in the front head 123, and the crankshaft 117 is inserted into the bearing portion 123a. Further, an opening (not shown) for guiding, to the discharge pipe 120, the refrigerant gas that flows through the discharge path 124c formed in the cylinder block 124 is formed in the front head 123. Additionally, this opening is closed and opened by a discharge valve (not shown) for preventing reverse flow of the refrigerant gas.

f) Rear Head

The rear head 125 covers the opposite side of the discharge path 124c side of the cylinder block 124. A bearing portion 125a is formed in the rear head 125, and the crankshaft 117 is inserted into the bearing portion 125a.

(4) Suction Pipe

The suction pipe 119 is disposed so as to penetrate the casing 100, with one end of the suction pipe 119 being fitted into the suction hole 124b formed in the cylinder block 124 and the other end of the suction pipe 119 being fitted into an outlet pipe 132 of an accumulator 131.

(5) Discharge Pipe

The discharge pipe 120 is disposed so as to penetrate the upper wall portion of the casing 100.

<Characteristics of First Embodiment>

(1)

The motor rotor 1 of the first embodiment is equipped with the oil passages 8 that are positioned further outside in the radial direction of the rotor core 2 than the gas passages 7 inside the rotor core 2 and allow the oil to flow from the upper end portion 10 to the lower end portion 9, which is the opposite direction of the direction in which the gas fluid flows through the gas passages 7. Consequently, the oil running from the gas passages 7 into clearances between the stacked steel plates 3 can be allowed to flow to the oil pool of the oil L in the bottom portion of the casing 100. As a result, the oil separation effect improves, and it becomes possible to prevent oil shortage and oil exhaustion.

(2)

Further, the motor rotor 1 of the first embodiment is equipped with the upper end plate 4 that closes the openings 8a on the upper end portion 10 side of the oil passages 8, so the gas and the oil can be prevented from flowing through the oil passages 8 from the lower end portion 9 side to the upper end portion 10 side, and it becomes possible to effectively prevent oil shortage.

(3)

Moreover, in the motor rotor 1 of the first embodiment, the magnet plates 11 are disposed further outward in the radial direction of the rotor core 2 than the gas passages 7 inside the rotor core 2. The magnet plates 11 fulfill the function of oil barriers that stop a flow of the oil running outward in the radial direction of the gas passages 7 through a space between two of the stacked steel plates 3 that are adjacent from the gas passages 7. Thus, the oil running from the gas passages 7 into the spaces between the stacked steel plates 3 collects at the magnet plates 11, and the oil droplets become larger, so it is possible to further improve the oil separation efficiency.

(4)

Moreover, in the motor rotor 1 of the first embodiment, the magnet plates 11 and the oil passages 8 are directly communicated with each other, so the oil droplets that have become larger at the places of the magnet plates 11 directly enter the oil passages 8, so reductions in the diameter and size of the oil droplets resulting from re-dispersion of the oil droplets can be avoided, and it is possible to further improve the oil separation efficiency.

(5)

Moreover, in the motor rotor 1 of the first embodiment, a resin whose oil resistance is high, such as a varnish, is applied in order to suppress running of the oil and the resin is disposed on passage inner walls of the oil passages 8 or a side peripheral surface of the rotor core 2, so running of the oil outward in the radial direction of the rotor core 2 from the oil passages 8 can be prevented, and it is possible to return the oil through the oil passages 8 to the oil pool in the bottom portion of the casing 100.

(6)

The compressor 101 of the first embodiment is equipped with the motor rotor 1 that is equipped with the oil passages 8 that are positioned further outside in the radial direction of the rotor core 2 than the gas passages 7 and allow the oil to flow from the upper end portion 10 to the lower end portion 9, which is the opposite direction of the direction in which the gas fluid flows through the gas passages 7, so the oil separation effect improves and it becomes possible to prevent oil shortage and oil exhaustion. For that reason, it also becomes possible to significantly extend the lifespan of the compressor 101, and product reliability also becomes higher.

<Modifications of First Embodiment>

(A)

In the first embodiment, the magnet plates 11 are employed as one example of the oil barriers of the present invention, but the present invention is not limited to this, and means other than the magnet plates 11 that stops running of the oil may also be used as the oil barriers.

Similarly, it is not particularly necessary for the oil passages 8 to have the function of preventing diffusion of magnetism generated from the magnet plates 11, so the oil passages 8 may be disposed in appropriate positions in the rotor core 2 and preferably in positions where the oil passages 8 are directly communicated with the oil barriers.

(B)

In the motor rotor 1 of the first embodiment, a configuration where a varnish or the like is applied as suppressing means that suppress running of the oil and that is disposed on passage inner walls of the oil passages 8 or a side peripheral wall of the rotor core 2 has been taken as an example and described, but the present invention is not limited to this, and it is possible to appropriately employ other means as the suppressing means as long as it is means that can prevent running of the oil.

(C)

In the first embodiment, the lower end portion 9 was used to describe the first axial direction end portion that is one axial direction end portion of the rotor core in the present invention and the upper end portion 10 was used to describe the second axial direction end portion on the opposite side, but in the present invention, the first axial direction end portion and the second axial direction end portion are not limited to this and may be variously changed depending on the orientation in which the motor rotor 1 is installed; for example, when the motor rotor 1 is disposed sideways, the first and second axial direction end portions become either the right end portion or the left end portion.

(D)

In the first embodiment, the oil running from the gas passages 7 into the clearances between the stacked steel plates 3 is returned through the oil passages 8, but the present invention is not limited to this; passages that extend toward the outer peripheral side in the radial direction of the gas passages 7 and are communicated with the oil passages 8 may also be disposed in some of the stacked steel plates 3 as passages that exude the oil.

(E)

In the motor rotor 1 of the first embodiment, a plural of the stacked steel plates 3 are fastened together with substantially even pressure by the rivets 6 to form an oil running control device or means, but the present invention is not limited to this and may also be equipped with oil running control means that partially compresses the stacked steel plates 3.

The oil running control means controls running of the oil outward in the radial direction of the gas passages 7 by applying compressive force from both axial direction ends of the rotor core 2 to a portion of the stacked steel plates 3 that is further outside in the radial direction than the magnet plates 11 that function as oil barriers.

Consequently, the oil running control means partially compresses a portion of the stacked steel plates 3 that is further outside in the radial direction than the magnet plates 11, so it becomes possible to reduce the clearances between the stacked steel plates 3 on the outer side of the magnet plates 11, enlarge the clearances between the stacked steel plates 3 on the inner side of the magnet plates 11, and control running of the oil. Thus, it becomes possible for the amount of oil running from the gas passages 7 to the magnet plates 11 to increase, and it becomes possible to suppress running of the oil further outside in the radial direction than the magnet plates 11.

Second Embodiment

Next, an embodiment of a motor rotor pertaining to a second embodiment of the present invention and a compressor equipped with the motor rotor will be described with reference to the drawings. It will be noted that the compressor pertaining to the second embodiment differs from the compressor 101 shown in FIG. 1 and FIG. 2 in that the motor rotor 1 is changed to a motor rotor 21 shown in FIG. 5, but in other respects the compressor pertaining to the second embodiment has the same configuration as that of the compressor shown in FIG. 1 and FIG. 2.

<Configuration of Motor Rotor 21>

Figure 5:
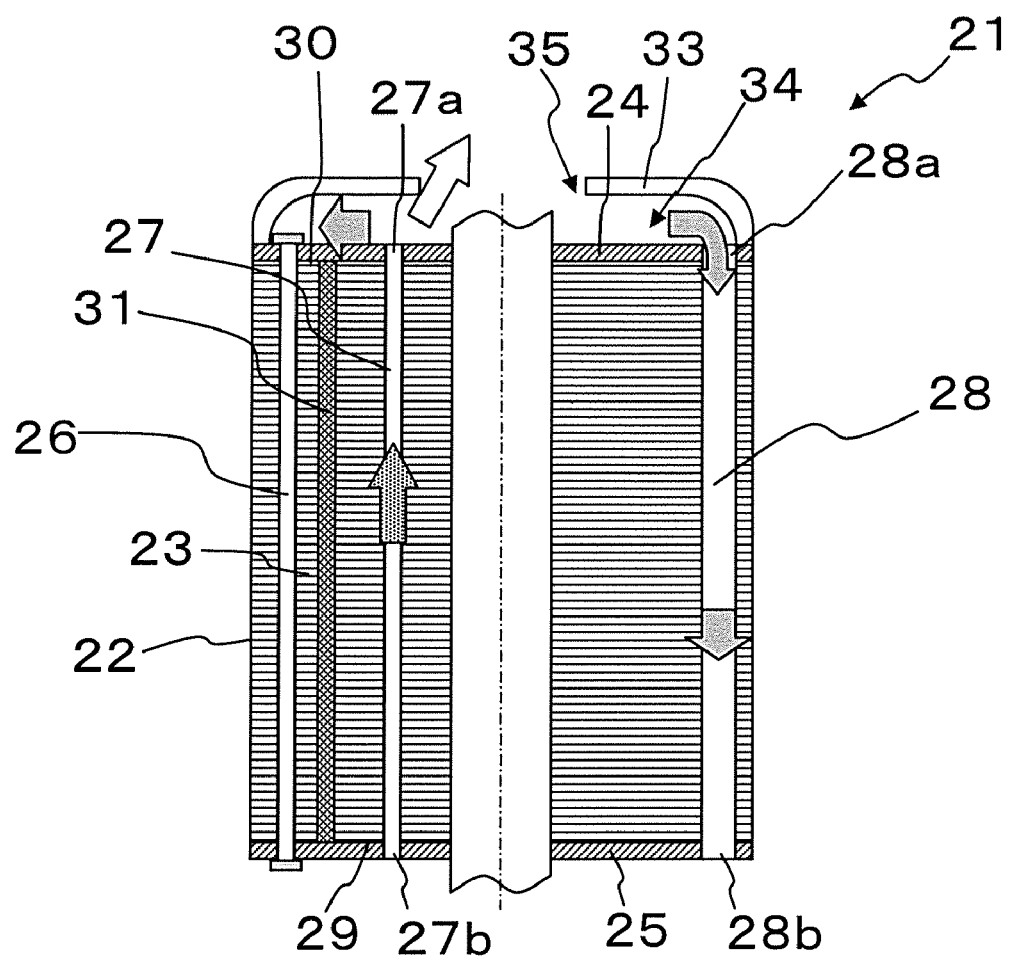
FIG. 5 is a diagram showing a motor rotor pertaining to a second embodiment of the invention as seen from the A-O-C cross section of FIG. 3.

The motor rotor 21 is, as shown in FIG. 5, equipped with a rotor core 22, an upper end plate 24, a lower end plate 25, rivets 26, plural gas passages 27, oil passages 28, magnet plates 31 and a guide member 33. The lower end plate 25 includes openings 27*b* that are communicated with the gas passages 27 and openings 28*b* that are communicated with the oil passages 28.

The rotor core 22 is a main portion of the motor rotor 21 that is configured to stack plural stacked steel plates 23.

The plural gas passages 27 are passages that penetrate the rotor core 22 in its axial direction and allow a gas fluid to flow therethrough from a lower end portion 29 (what is called a first axial direction end portion in the present invention) that is one axial direction end portion of the rotor core 22 to an upper end portion 30 (what is called a second axial direction end portion in the present invention) on the opposite side. It will be noted that it suffices as long as there is at least one of the gas passages 27 and that the number of the gas passages 27 is not particularly limited in the present invention.

The oil passages 28 are passages that are positioned further outside in the radial direction of the rotor core 22 than the gas passages 27 inside the rotor core 22 and allow the oil to flow from the upper end portion 30 to the lower end portion 29, which is the opposite direction of the direction in which the gas fluid flows through the gas passages 27. The oil passages 28 can allow the oil running from the gas passages 27 into clearances between the stacked steel plates 23 to flow to the oil pool of the oil L in the bottom portion of the casing 100 (see FIG. 1), so the oil separation effect improves, and it is possible to prevent oil shortage.

It will be noted that the planar arrangement of the rivets 26, the plural gas passages 27, the oil passages 28 and the magnet plates 31 is the same as the planar arrangement of the rivets 6, the plural gas passages 7, the oil passages 8 and the magnet plates 11 shown in FIG. 3.

The guide member 33 is a member that covers the upper portion of the upper end plate 24 and includes a communication space 34 and a gas fluid outlet 35. The communication space 34 allows openings 27*a* on the upper end portion 30 side of the gas passages 27 and openings 28*a* on the upper end portion 30 side of the oil passages 28 to be communicated with each other. The gas fluid outlet 35 is an opening that opens further inside in the radial direction of the rotor core 22 than the openings 27*a* on the upper end portion 30 side of the gas passages 27.

Because of the structure where the upper openings 27*a* and 28*a* of the gas passages 27 and the oil passages 28 are allowed to be communicated with each other by the guide member 33 of FIG. 5, the gas and the oil can be separated inside the communication space 34 by centrifugal force during operation of the motor rotor 21. Consequently, just the gas, whose specific gravity is lighter than that of the oil, can be allowed to flow to the gas fluid outlet 35 that is further inside in the radial direction of the rotor core 22 than the openings 27*a* of the gas passages 27, and the oil, whose specific gravity is heavier than that of the gas, can be caused by centrifugal force to flow to the oil passages 28 that are further outside in the radial direction of the rotor core 22 than the openings 27*a* of the gas passages 27, so the oil can be reliably caused to flow to the oil pool of the oil L in the bottom portion of the casing 100 (see FIG. 1).

Further, the oil passages 28 have a structure where the flow resistance of the gas fluid is larger in the oil passages 28 than in the gas passages 27 in order to prevent the gas from reversely flowing upward through the oil passages 28; specifically, the total area of the cross-sectional area of the gas passages 27 is larger than the total area of the cross-sectional area of the oil passages 28.

Further, the compressor of the second embodiment uses a high-pressure refrigerant comprising carbon dioxide as the gas fluid, and, in order to suppress running of the oil from the oil passages 27 into the stacked steel plates 23, the compressor uses high-viscosity refrigerating machine oil (called "oil" below) whose 100-degree viscosity is equal to or higher than 10 cSt as the oil for lubricating its mechanical parts (see the rotary compression mechanism part 115, the bearing portions for the crankshaft 117 and the like in FIG. 1).

<Characteristics of Second Embodiment>

(1)

The motor rotor 21 of the second embodiment is, similar to the motor rotor 1 of the first embodiment, equipped with the oil passages 28 that are positioned further outside in the radial direction of the rotor core 22 than the gas passages 27 inside the rotor core 22 and allow the oil to flow from the upper end portion 30 to the lower end portion 29, which is the opposite direction of the direction in which the gas fluid flows through the gas passages 27. Consequently, the oil running from the gas passages 27 into clearances between the stacked steel plates 23 can be allowed to flow to the oil pool of the oil L in the bottom portion of the casing 100. As a result, the oil separation effect improves, and it becomes possible to prevent oil shortage and oil exhaustion.

(2)

Moreover, the motor rotor 21 of the second embodiment is equipped with the guide member 33 that includes the communication space 34 that allows the openings 27*a* on the upper end portion 30 side of the gas passages 27 and the openings 28*a* on the upper end portion 30 side of the oil passages 28 to be communicated with each other and the gas fluid outlet 35 that opens further inside in the radial direction of the rotor core 22 than the openings 27*a* on the upper end portion 30 side of the gas passages 27, so the gas and the oil can be separated inside the communication space 34 by centrifugal force during operation of the motor rotor 21. Thus, the oil can be reliably returned to the oil pool in the bottom portion of the casing of the compressor; as a result, the oil separation effect improves, and oil shortage can be prevented.

(3)

Further, in the motor rotor 21 of the second embodiment, the flow resistance of the gas fluid is larger in the oil passages 28 than in the gas passages 27, so a flow of the gas through the oil passages 28 from the lower end portion 29 to the upper end portion 30 can be suppressed, the oil is no longer pushed and returned by the gas in the oil passages 28 to the upper end portion 30, and the oil separation efficiency improves.

(4)

Moreover, the motor rotor 21 of the second embodiment has a structure where the total area of the cross-sectional area of the gas passages 27 is larger than the total area of the cross-sectional area of the oil passages 28, so the flow resistance of the gas fluid can be made larger in the oil passages 28 than in the gas passages 27 by setting and changing the difference in the flow path resistance of the gas fluid by the flow path cross-sectional areas. As a result, a flow of the gas through the oil passages 28 from the lower end portion 29 to the upper end portion 30 can be easily and inexpensively suppressed, and it becomes possible for the oil separation efficiency to improve.

(5)

The compressor of the second embodiment is, similar to the compressor of the first embodiment, equipped with the motor rotor 21 that is equipped with the oil passages 28 that are positioned further outside in the radial direction of the rotor core 22 than the gas passages 27 and allow the oil to flow from the upper end portion 30 to the lower end portion 29, which is the opposite direction of the direction in which the gas fluid flows through the gas passages 27, so the oil separation effect improves, and it becomes possible to prevent oil shortage and oil exhaustion. For that reason, it also becomes possible to significantly extend the lifespan of the compressor, and product reliability also becomes higher.

(6)

Moreover, the compressor of the second embodiment uses a high-pressure gas refrigerant comprising carbon dioxide and uses high-viscosity oil whose 100-degree viscosity is equal to or higher than 10 cSt even though the density of the gas is high, so running of the oil from the oil passages 28 to the stacked steel plates 23 can be suppressed, and the gas and the oil can be effectively separated in the communication space 34 inside the guide member 33 by centrifugal force during operation of the motor rotor 21, so the oil separation efficiency improves.

INDUSTRIAL APPLICABILITY

The present invention is capable of being applied to a motor rotor that is used in an environment where a gas fluid and oil circulate and to a compressor equipped with the motor rotor.

The compressor equipped with the motor rotor is applicable to a rotary compressor that uses a piston where a blade and a rotor portion are integrated such as described in the preceding embodiments, a rotary compressor where the blade and the rotor portion are separate, and other types of compressors.

What is claimed is:

1. A motor rotor comprising:
   a rotor core configured to rotate about a rotation axis and having a plurality of stacked steel plates;
   at least one gas passage penetrating the rotor core in its axial direction to allow a gas fluid to flow therethrough from a first axial direction end portion of the rotor core to a second axial direction end portion of the rotor core on an opposite axial side of the first axial direction end portion; and
   an oil passage positioned radially outwardly of the gas passage inside the rotor core relative to the rotation axis to allow oil to flow from the second axial direction end portion to the first axial direction end portion, which is an opposite flow direction to a flow direction of the gas fluid flowing through the gas passage.

2. The motor rotor according to claim 1, further comprising a closing member arranged to close an opening on the second axial direction end portion side of the oil passage.

3. The motor rotor according to claim 2, further comprising an oil barrier disposed radially outwardly of the gas passage inside the rotor core to stop a flow of the oil running radially outwardly from the gas passage through a space between two of the stacked steel plates that are adjacent to the gas passage.

4. The motor rotor according to claim 3, wherein the oil barrier and the oil passage are directly communicated with each other.

5. The motor rotor according to claim 4, further comprising an oil running control device that controls running of the oil radially outwardly from the gas passage by applying compressive force from opposite axial direction ends of the rotor core to a portion of the stacked steel plates that is radially outwardly of oil barrier.

6. The motor rotor according to claim 5, further comprising a suppressing portion disposed on a passage inner wall of the oil passage or a side peripheral wall of the rotor core to suppress running of oil therethrough.

7. A compressor including the motor rotor according to claim 6.

8. A compressor comprising the motor rotor according to claim 7, wherein
   the compressor uses a refrigerant comprising carbon dioxide as the gas fluid and uses refrigerating machine oil whose 100-degree viscosity is equal to or higher than 10 cSt as the oil.

9. The motor rotor according to claim 3, further comprising an oil running control device that controls running of the oil radially outwardly from the gas passage by applying compressive force from opposite axial direction ends of the rotor core to a portion of the stacked steel plates that is radially outwardly of oil barrier.

10. The motor rotor according to claim 1, further comprising
    an oil barrier disposed radially outwardly of the gas passage inside the rotor core to stop a flow of the oil running radially outwardly from the gas passage through a space between two of the stacked steel plates that are adjacent to the gas passage.

11. The motor rotor according to claim 10, wherein the oil barrier and the oil passage are directly communicated with each other.

12. The motor rotor according to claim 10, further comprising
    an oil running control device that controls running of the oil radially outwardly from the gas passage by applying compressive force from opposite axial direction ends of the rotor core to a portion of the stacked steel plates that is radially outwardly of oil barrier.

13. The motor rotor according to claims 1, further comprising
    a suppressing portion disposed on a passage inner wall of the oil passage or a side peripheral wall of the rotor core to suppress running of oil therethrough.

14. The motor rotor (21) according to claim 1, further comprising
   a guide member disposed adjacent the second axial direction end portion to form
      a communication space between the guide member and the second axial end portion such that an opening in the second axial direction end portion at the gas passage and an opening in the second axial direction end portion at the oil passage are communicated with each other through the communication space, and
      a gas fluid outlet through the communication member that is disposed radially inwardly of the opening in the second axial direction end portion at the gas passage.

15. The motor rotor according to claim 14, wherein
the gas passage and the fluid passage are arranged and configured such that a flow resistance of gas fluid in the oil passage is larger than in the gas passage.

16. The motor rotor according to claim 15, wherein
a total cross-sectional area of the gas passage is larger than a total cross-sectional area of the oil passage.

17. A compressor including the motor rotor according to claim 16.

18. A compressor comprising the motor rotor according to claim 17, wherein
   the compressor uses a refrigerant comprising carbon dioxide as the gas fluid and uses refrigerating machine oil whose 100-degree viscosity is equal to or higher than 10 cSt as the oil.

19. A compressor including the motor rotor according to claim 1.

20. A compressor comprising the motor rotor according to claim 19, wherein
   the compressor uses a refrigerant comprising carbon dioxide as the gas fluid and uses refrigerating machine oil whose 100-degree viscosity is equal to or higher than 10 cSt as the oil.

* * * * *

UNITED STATES PATENT AND TRADEMARK OFFICE
CERTIFICATE OF CORRECTION

| | |
|---|---|
| PATENT NO. | : 8,044,542 B2 |
| APPLICATION NO. | : 12/525868 |
| DATED | : October 25, 2011 |
| INVENTOR(S) | : Masanori Masuda et al. |

It is certified that error appears in the above-identified patent and that said Letters Patent is hereby corrected as shown below:

Column 14,
Line 25, Claim 3, "is radially outwardly of oil barrier" should read -- is radially outwardly of the oil barrier --;
Line 43, Claim 9, "is radially outwardly of oil barrier" should read -- is radially outwardly of the oil barrier --;
Line 60, Claim 12, "is radially outwardly of oil barrier" should read -- is radially outwardly of the oil barrier --;

Column 15,
Line 1, Claim 14, "The motor rotor (21) according to claim 1," should read -- 14. The motor rotor according to claim 1, --.

Signed and Sealed this
Thirty-first Day of July, 2012

David J. Kappos
*Director of the United States Patent and Trademark Office*